(12) United States Patent
Zhang et al.

(10) Patent No.: US 9,204,093 B1
(45) Date of Patent: Dec. 1, 2015

(54) INTERACTIVE COMBINATION OF GAME DATA AND CALL SETUP

(71) Applicant: Palmwin Information Technology (Shanghai) Co. Ltd., Shanghai (CN)

(72) Inventors: Huaichang Zhang, Nanjing (CN); Huanan Ma, Nanjing (CN); Liu Yang, Nanjing (CN); Guoqiang Zhang, Nanjing (CN)

(73) Assignee: Palmwin Information Technology (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/514,237

(22) Filed: Oct. 14, 2014

(51) Int. Cl.
*H04M 3/42* (2006.01)
*H04N 7/14* (2006.01)
*H04M 19/04* (2006.01)
*A63F 13/50* (2014.01)

(52) U.S. Cl.
CPC ............... *H04N 7/147* (2013.01); *A63F 13/50* (2014.09); *H04M 19/041* (2013.01)

(58) Field of Classification Search
CPC ...... H04N 7/147; H04M 19/041; A63F 13/50
USPC ................................ 379/207.16; 348/14.07
See application file for complete search history.

(56) References Cited

FOREIGN PATENT DOCUMENTS

WO  WO-2014/008446 A1  1/2014

*Primary Examiner* — Creighton Smith
(74) *Attorney, Agent, or Firm* — Fenwick & West LLP

(57) ABSTRACT

A solution is provided to enhanced user experience in digital media content sharing by inactively combining call setup for a video call with a caller's game performance data. A first communication terminal is used by the caller to initiate a video call to a callee, who uses a second communication terminal to receive the call. The caller plays a computer game while waiting for the call setup. During the call setup, the first terminal periodically evaluates the caller's game performance and generates a ring tone adjustment instruction that modifies an original ring tone played by the callee's communication terminal. The adjusted ring tone indicates caller's emotions. Integrating a caller's game performance data with a video call setup makes the call setup more joyful for the parties and conveys valuable psychotherapeutic value in the video communication between the parties.

36 Claims, 17 Drawing Sheets

INTERACTIVE COMBINATION OF GAME DATA AND CALL SETUP

BACKGROUND

The disclosure relates generally to Internet based digital media processing, and specifically to interactively combining call setup and game data for mobile computing devices.

The increasingly popular smart handheld devices, such as smart phones, tablet computers, and increased network bandwidth (for wired and wireless networks) have provided more communications platforms for digital media content consumption and sharing. For example, a video call between two parties on their smart phones allows the parties to communicate more interactively with each other in real time. Similarly, a computer game can be played on a user's mobile phone while waiting for a video call to reach to another party.

However, a video communication over mobile phones takes time to set up and reach a party being called (also referred to as a "callee") over the networks due to possible network delay, loss of data packets and absence of the callee. The long and sometimes boring long waiting for a caller of a video communication can degrade the caller's communication experience. Furthermore, real-time video communication has become an important means in social networking, but existing solutions for real-time video communication often ignore the significant psychotherapeutic value of a real-time video communication in terms of expressing human emotions, e.g., willingness of the caller and urgency of the call.

SUMMARY

Embodiments of the invention enhance user experience in digital media content sharing by inactively combining call setup for a video call with a caller's game performance data. Integrating a caller's game performance data with a video call setup makes the call setup more joyful for the parties and conveys valuable psychotherapeutic value in the video communication between the parties.

A first communication terminal is used by the caller to initiate a video call to a callee, who uses a second communication terminal to receive the call. The caller plays a computer game while waiting for the call setup. The first communication terminal periodically evaluates the caller's game performance and generates a ring tone adjustment instruction that modifies an original ring tone played by the callee's communication terminal based on the caller's game performance data. Responsive to the end of the call setup (e.g., the caller or the callee ends the call or the callee accepts the call), the first communication terminal transmits caller's overall game performance data to the second communication terminal for display Either the caller's communication terminal or the callee's communication terminal can modify the original ring tone played by the callee's communication terminal based on the ring tone adjustment instruction.

A ring tone associated with a callee's communication terminal is an audio sound made by the callee's communication terminal to indicate an incoming call to the callee's communication terminal. In one embodiment, the ring tone is the dynamic outcome of playing an associated ring tone file according to a ring tone adjustment instruction. A ring tone is described by one or more metadata associated with the ring tone, such as the volume, speed and style of the ring tone. Modifying the ring tone associated with the callee's communication terminal based on the caller's game performance helps to convey the valuable psychotherapeutic value in the video call such as the caller's emotions (e.g., willingness to make the call) or the urgency of the call.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Overview

Figure 1:
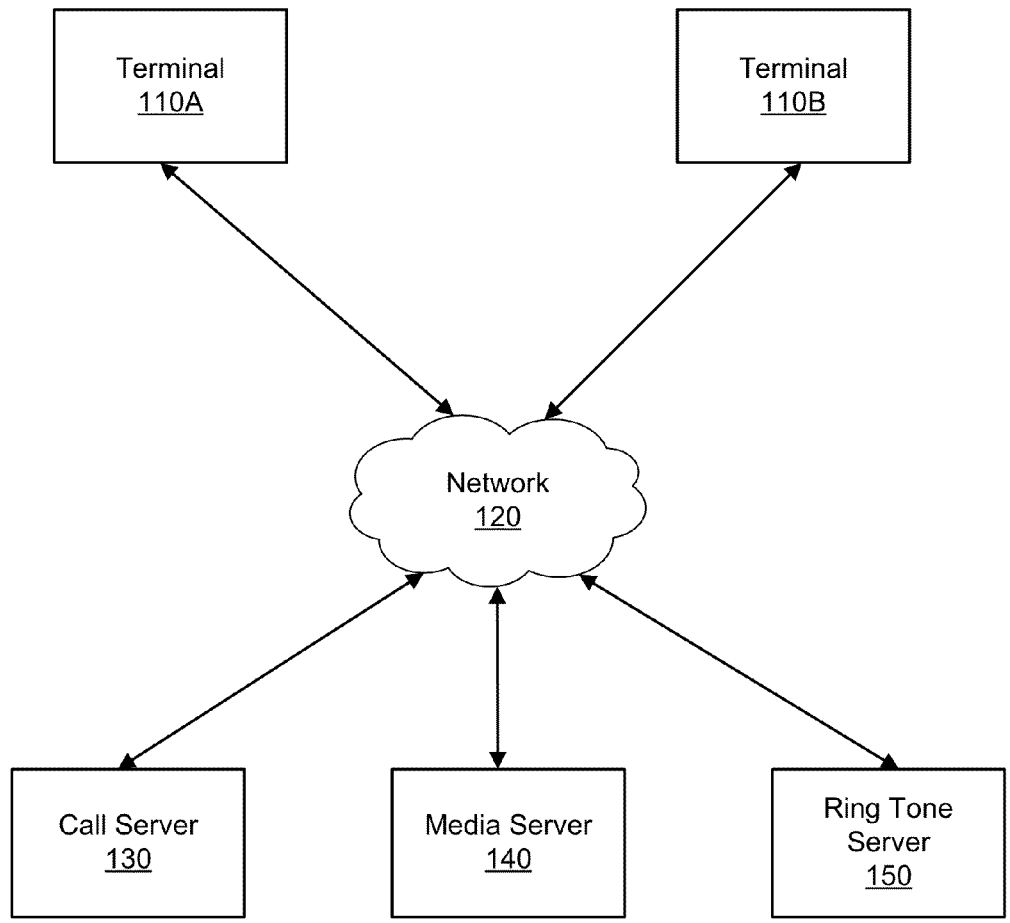
FIG. 1 is a block diagram of a computing environment for interactively combining call setup and game data for mobile computing devices according to one embodiment.

FIG. 1 is a block diagram of a computing environment for interactively combining call setup and game data for mobile computing devices according to one embodiment. The computing environment includes a first communication terminal 110A (also referred to as "first terminal") communicates with a second communication terminal 110B (also referred to as "second terminal") over a network 120. The computing environment also includes a call server 130, a media server 140 and a ring tone sever 150 to facilitate call setup and communication of ring tone adjustment instructions and caller's game performance data between the first terminal 110A and the second terminal 110B. Only two terminals (110A and 110B), one call server 130, one media server 140 and one ring tone server 150 are shown in FIG. 1 in order to simplify and clarify the description. Embodiments of the computing environment can have many communication terminals, call servers 130, media servers 140 and ring tone servers 150 connected to the network 120. Likewise, the functions performed by the various entities of FIG. 1 may differ in different embodiments.

In one embodiment, a user of the first terminal 110A (also referred to as a "caller") calls a user of the second terminal 110B (also referred to as a "callee"). Responsive to the call from the caller, the second terminal 110B of the callee plays a ring tone file to generate an audio sound (i.e., a ring tone) indicating the call from the caller. The caller plays a computer game on the first terminal 110A during the call setup. The first terminal 110A periodically generates game performance data for the caller and uses the caller's game performance data to generate ring tone adjustment instructions for adjusting the ring tone of the second terminal 110B. For example, responsive to a ring tone adjustment instruction received from the caller, the second terminal 110B plays a ring tone file according to the ring tone adjustment instruction and generates an adjusted ring tone. The adjusted ring tone indicates the caller's human emotions to the callee, e.g., willingness of the caller and urgency of the call. The ring tone of the callee's communication terminal can be adjusted by the first terminal 110A or by the second terminal 110B based, at least in part, on where the ring tone files are stored and who, the caller or the callee, decides the ring tone file to be played by the callee's communication terminal. Responsive to the end of the call setup, the second terminal 110B of the callee receives the caller's overall game performance data and presents the game performance data on a display of the second terminal 110B. To simplify and clarify the description, the first terminal 110A is used by a caller of a video communication and the second terminal 110B is used by a callee of the video communication.

The call server 130 is a computer server that facilitates video communication among multiple communication terminals. In one embodiment, the call server 130 processes data associated with video calls and network connections, such as registration of communication terminals of a video call, transmission of call requests, call acknowledgements, requests to end video calls and ring tone adjustment instructions. Other embodiments of the call server 130 may include additional and/or different functions than described herein The media server 140 is a computer server that processes the audio or video streams associated with video communication and computer games. In one embodiment, the media server 140 is dedicated to deliver ring tone data received from a caller's communication terminal to a callee's communication terminal. The media server 140 is further configured to perform various functions associated with video communication, such as recording, encoding, decoding, storing and playing back. Other embodiments of the media server 140 include additional and/or different functions than described herein.

The ring tone sever 150 is a computer server that stores one or more ring tone files and processes ring tone files, such as distributing a ring tone file to a communication terminal upon request. In one embodiment, a ring tone is an audio sound made by a communication terminal to indicate an incoming call, for example, a customizable sound used on the first terminal 110A or on the second terminal 110B. In one embodiment, the audio sound of a ring tone is the dynamic outcome of executing a ring tone file associated with the ring tone according to a ring tone adjustment instruction. In another embodiment, the audio sound of a ring tone is the dynamic outcome of executing a ring tone file associated with the ring tone without a ring tone adjustment instruction. The ring tone file generated without a ring tone adjustment instruction is referred to as a default ring tone or an original ring tone. Other embodiments of a ring tone may include a warbling, chirping (where the frequency of sound signals of the ring tone increases or decreases with time) or other sound.

A ring tone file, e.g., a static song file, associated with a ring tone is an executable file that generates the ring tone. In one embodiment, the ring tone file associated with a ring tone includes one or more metadata describing characteristics of the ring tone, such as the source of the ring tone (e.g., a song of a user's own music collection), style of the ring tone (e.g., monophonic, polyphonic, an audio recording, or a singing tone created in karaoke style), ring tone encoding format (e.g., MP3, 3GP, AAC), volume of the ring tone, speed to play the ring tone and variations of the ring tone measured by the interval between two consecutive rings. The ring tone file associated with a ring tone may also include an identification of the ring tone, e.g., a descriptive name of the ring tone or a numeric number of the ring tone.

A ring tone file can be played, according to a ring tone adjustment instruction, to generate a ring tone different from its original ring tone. For example, a ring tone file can be played to generate an adjusted ring tone having a different playback speed, playback volume and style from its original playback speed, volume and style, respectively. In one embodiment, a communication terminal generates a ring tone adjustment instruction, based on a caller's game performance, that modifies one or more metadata describing the characteristics of a ring tone. For example, a ring tone adjustment instruction instructs a communication terminal to speed up the playback of a default ring tone to indicate urgency of an incoming call. In one embodiment, different adjustments to a ring tone are presented by different control modes associated with the ring tone.

The network 120 enables communications among the first terminal 110A, the second terminal 110B, the call server 130, the media server 140 and the ring tone server 150 and can comprise the Internet as well as wireless communications networks. In one embodiment, the network 120 uses standard communications technologies and/or protocols. Thus, the network 120 can include links using technologies such as Ethernet, 802.11, worldwide interoperability for microwave access (WiMAX), 4G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

A communication terminal, e.g., the first terminal 110A or the second terminal 110B, is an electronic device used by a user to perform functions such as communicating and consuming digital media content including video chat, executing software applications, browsing websites hosted by web servers on the network 120 and interacting with the call server 130, the media server 140 and the ring tone sever 150. A communication terminal may be a smart phone, or a tablet, notebook, or desktop computer or a dedicated game console. The communication terminal includes and/or interfaces with a display device on which the user may view the video files and other digital content. In addition, the communication terminal provides a user interface (UI), such as physical and/or on-screen buttons, with which the user may interact with the communication terminal to perform functions such as video chatting, playing a video game, selecting digital content, downloading samples of digital content, and purchasing digital content. An exemplary communication terminal is described in more detail below with reference to FIG. 3.

Computing System Architecture

Figure 2:
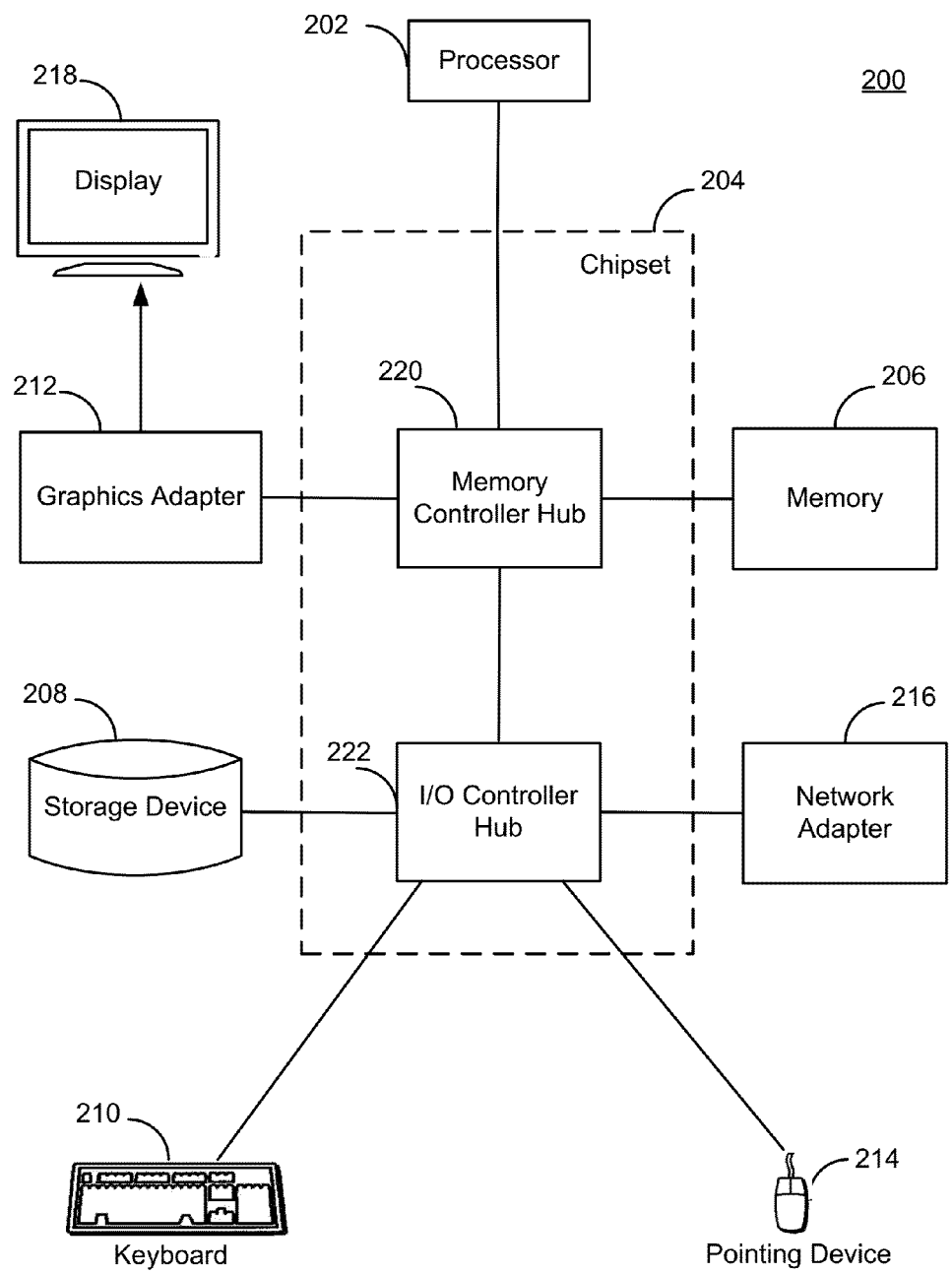
FIG. 2 is a block diagram illustrating an example of a computing device for acting as a communication terminal in one embodiment.

The entities shown in FIG. 1 are implemented using one or more computers. FIG. 2 is a high-level block diagram of a computer 200 for acting as the first terminal 110A, the second terminal 110B, the call server 130, the media server 140 and/or the ring tone server 150. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In one embodiment, the display 218 receives visual input generated by the processor 202. For example, the touch sensitive surface of the display 218 detects the touch operation on or near the touch sensitive surface and transmits the touch operation to the processor 202 to determine a type of the touch event. The processor 202 provides, according to the type of the touch event, a corresponding visual output to the display 218 for display.

The computer 200 functioning as the first terminal 110A or the second terminal 110B may further include a sensor, such as an optical sensor and a motion sensor. The first terminal 110A or the second terminal 110B may also have an audio circuit, a loudspeaker, and a microphone to provide audio interfaces between a user and the terminal. A WiFi module can be included in the first terminal 110A or the second terminal 110B to provide wireless Internet access for the user, who can send or receive emails, browse webpages and access streaming media.

In addition, the computer 200 can lack certain illustrated components. For example, the computers acting as the call server 130, the media server 140 or the ring tone server 150 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Interactive Combination of Call Setup and Game Data

Figure 3:
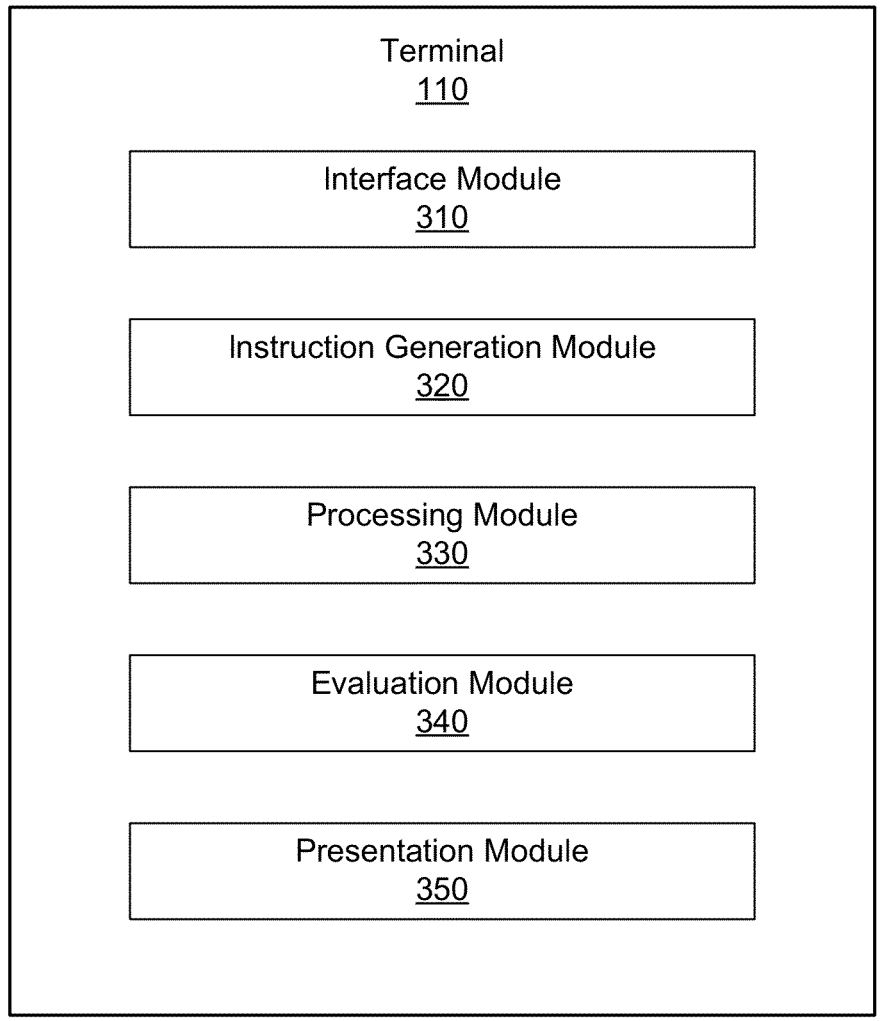
FIG. 3 is a block diagram illustrating computer modules of a communication terminal for interactively combining call setup and game data according to one embodiment.

FIG. 3 is a block diagram illustrating a communication terminal, e.g., the first terminal 110A or the second terminal 110B, for interactively combining a caller's game performance data with a call setup between the first terminal 110A and the second terminal 110B according to one embodiment. For simplicity of illustration, assume the modules illustrated in FIG. 3 are for the first terminal 110A used by a caller of a video call with a callee and the first terminal 110A is a smart handheld device such as a smart phone. The second terminal 110B is used by a callee to receive a video call from the caller using the first terminal 110A. The second terminal 110B may contain the same modules and/or additional or different modules from the ones described below. In the embodiment shown in FIG. 3, the first terminal 110A has an interface module 310, an instruction generation module 320, a processing module 330, an evaluation module 340 and a presentation module 350. Other embodiments may contain different functional modules and different number of modules.

The interface module 310 is responsible for generating call requests and acknowledgements and processing call registration and network connection with the call server 130. In one embodiment, the interface module 310 detects a caller dialing a phone number using his/her mobile phone, e.g., the first terminal 110A, and generates a call request and sends the call request to the call server 130. In one embodiment, a call request includes an identification of the caller, such as the caller ID, an identification of the callee, such as the callee ID and an identification of a ring tone file played by the callee's communication terminal, e.g., callee's mobile phone. In another embodiment, a call request includes a caller ID and a callee ID, where the ring tone file played by the callee's communication terminal is stored in a ring tone server and is accessible by the callee's communication terminal.

The interface module 310 is also responsible for communicating caller's overall performance data and ring tone adjustment instructions, generated by the caller's communication terminal, to the callee's communication terminal. For an interface module 310 associated with a caller's communication terminal, the interface module 310 transmits the caller's overall performance data at the end of the call setup. Furthermore, interface module 310 associated with the caller's communication terminal transmits the ring tone adjustment instructions to the call server 130, that relays the ring tone adjustment instructions to the callee's communication terminal. For an interface module 310 associated with a callee's communication terminal, the interface module 310 receives the ring tone adjustment instructions generated by the caller's communication terminal and sends the instructions to the processing module 330 of the callee's communication terminal for further processing.

The instruction generation module 320 generates ring tone adjustment instructions based on caller's game performance data on a caller's communication terminal. A ring tone adjustment instruction instructs the callee's communication terminal how to adjust an original ring tone played by the callee's communication terminal. Examples of adjustment include increasing playback speed of the original ring tone, shortening the time intervals between consecutive rings and increasing playback volume of the original ring tone (e.g., a louder sound when the callee's communication terminal rings). In one embodiment, the ring tone adjustment instructions are executable by a computer processor of a communication terminal, e.g., the first terminal 110A or the second terminal 110B.

In one embodiment, the ring tone adjustment instructions are generated based on the caller's game performance data that describes the performance of the caller playing a computer game during the call setup with the callee. During the call setup, the instruction generation module 320 periodically maps the caller's game performance to one of the ring tone control modes of a ring tone played by the second terminal 110B. For example, a caller plays a bubble shooting game during the call setup with the callee and the caller's game performance is measured by how many bubbles shot by the caller during a fixed period of time, e.g., 15 seconds. The instruction generation module 320 of the caller's communication terminal selects a slow playback speed of the ring tone to be played by the callee's communication terminal responsive to the number of the bubbles shot by the caller below a predetermined threshold value. On the other hand, the instruction generation module 320 selects a fast playback speed of the ring tone to be played by the callee's communication terminal responsive to the number of the bubbles shot by the caller exceeding another predetermined threshold value.

The processing module 330 adjusts the ring tone associated with a callee's communication terminal based on the ring tone adjustment instructions, such as speeding up the playback of the ring tone, shortening the intervals between consecutive rings and increasing the loudness of the playback of the ring tone. In one embodiment, the caller's communication terminal determines the ring tone file to be played by the callee's communication terminal and generates an adjusted ring tone based on the caller's game performance. The caller's communication terminal transmits the adjusted ring tone data to the callee's communication terminal, which plays back the adjusted ring tone. In another embodiment, the callee's communication terminal receives a ring tone adjustment instruction, generates an adjusted ring tone according to the received ring tone adjustment instruction and plays back the adjusted ring tone.

The evaluation module 340 evaluates the performance of a caller playing a computer game during a call setup and generates game performance data based on the evaluation. In one embodiment, the evaluation module 340 periodically evaluates the caller's game performance and generates overall game performance data based on the periodical evaluations. An example of the periodic game performance data includes information describing the performance of the caller who plays the computer game during a fixed period of time of a call setup and overall game performance data describes the overall game performance of the caller during the call up.

In one embodiment, a caller's game performance is measured in terms of the user's participation in the game (e.g., how fast the user hits the touch screen of the first terminal 110A), and percentage of points earned by the user over a threshold value. The caller's game performance can be classified into different grades, each of which has a corresponding performance measurement, e.g., a numeric value representing how many bubble shot by the caller during the call setup. The evaluation module 340 may also define one or more game performance threshold values and compares the caller's game performance with the threshold values for game performance classification.

Figure 9:
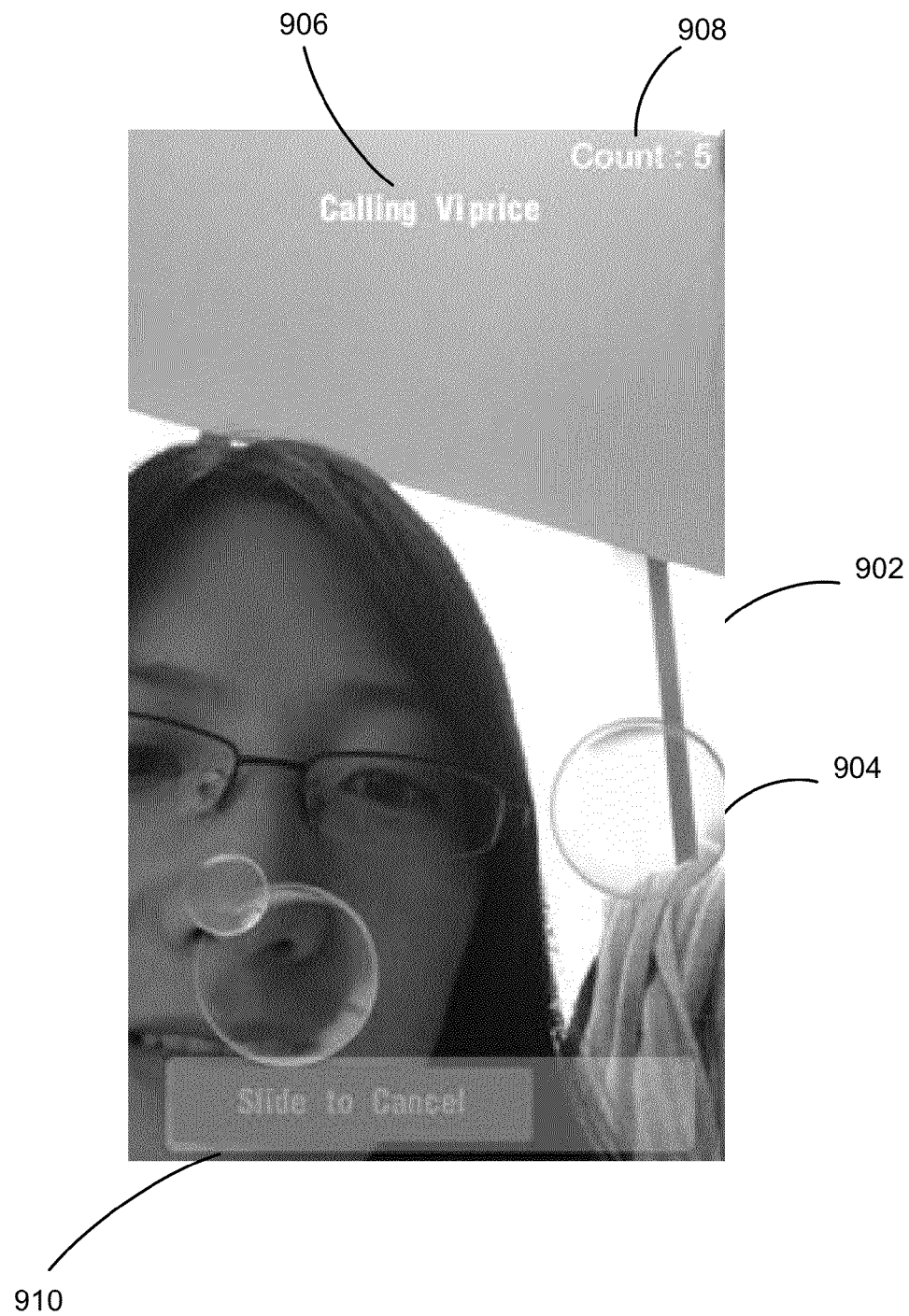
FIG. 9 illustrates an exemplary interface of a caller's communication terminal during a call setup.
Figure 10:
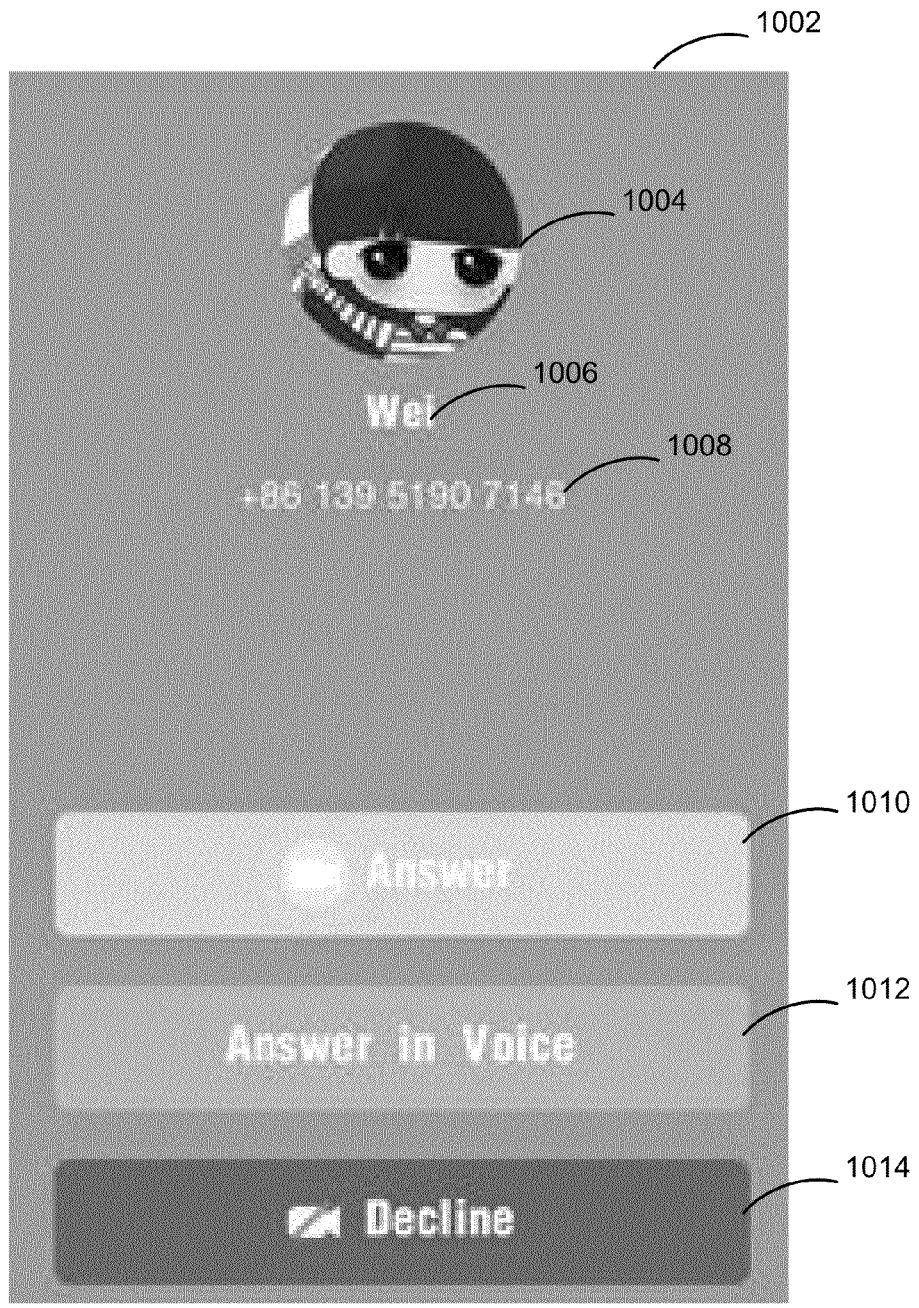
FIG. 10 illustrates an exemplary interface of a callee's communication terminal during a call setup.
Figure 11:
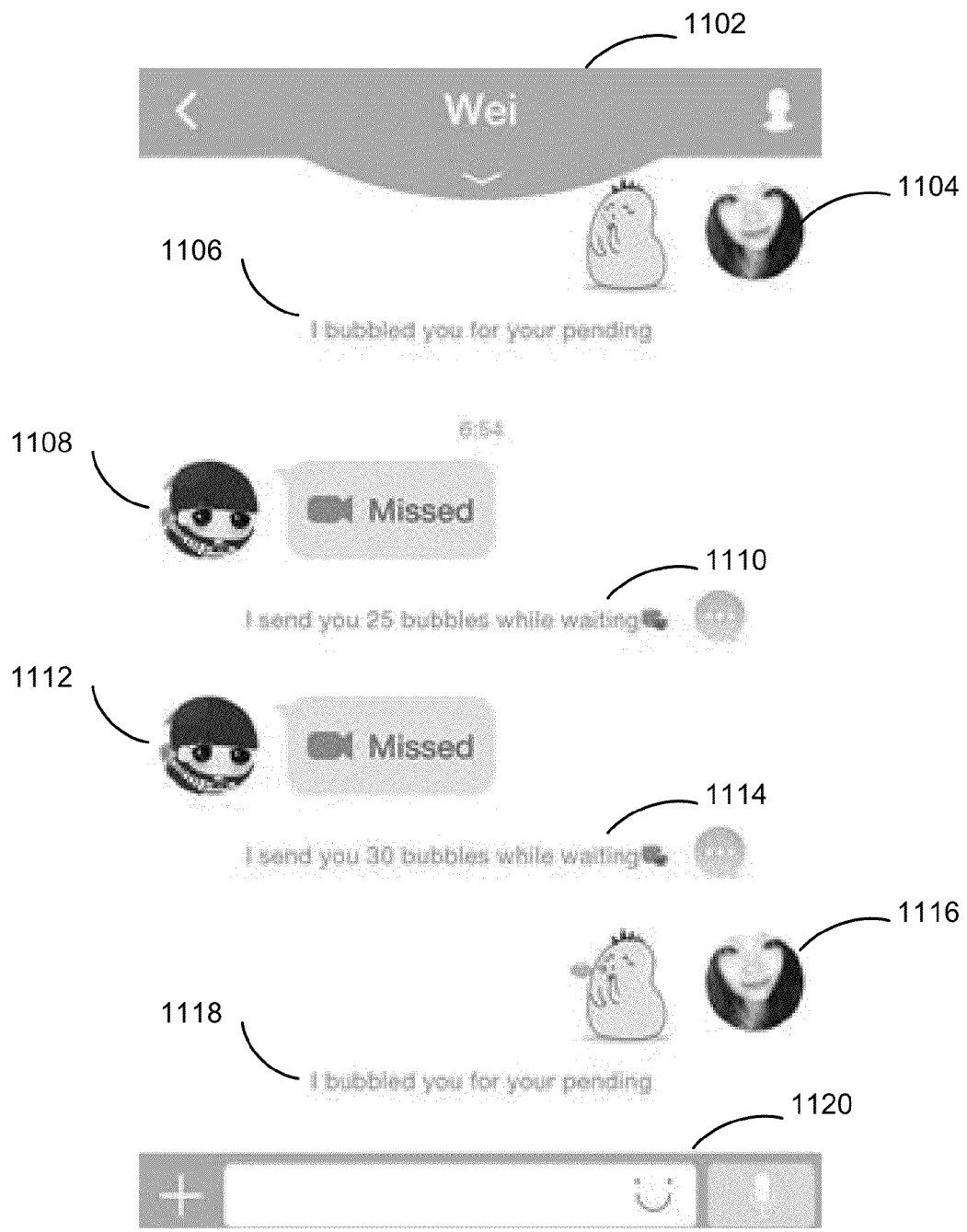
FIG. 11 illustrates an exemplary presentation of call history on a callee's communication terminal illustrated in FIG. 10.

The presentation module 350 presents a caller's game performance data and call history on a callee's communication terminal. In one embodiment, the presentation module 350 presents the caller's game performance data in conjunction with call history on the callee's communication terminal. The game performance data can be described in text, which is shown with the time line of the call history associated with the callee's communication terminal. FIG. 9, FIG. 10 and FIG. 11 described below show exemplary interfaces presented by the presentation module 350.

FIG. 9 illustrates an exemplary interface 902 of a caller's communication terminal during a call setup. In the example illustrated in FIG. 9, the caller is Wei (the female shown in the interface) and the callee is Viprice. The presentation module 350 of caller Wei's mobile phone shows the callee's identification 906 on the display of caller Wei's mobile phone. During the call setup for the call from caller Wei to callee Viprice, caller Wei plays a bubble shooting game and caller Wei's game performance is measured by how many bubbles 904 shot by her during the call setup. In the example illustrated in FIG. 9, caller Wei shot 5 bubbles (indicated by the count 908 shown on the display) at the time the exemplary interface 902 was captured. During the call setup, caller Wei has a choice to terminate the game play by sliding a cancelation slider 910 and caller Wei's game performance is measured between the time caller Wei plays the game and the time she slides the cancelation slider 910, or between when she plays the game and when the call setup ends. The detection of end of a call setup is further described with reference to FIG. 5A, FIG. 5B and FIG. 5C below.

FIG. 10 illustrates an exemplary interface 1002 of a callee's communication terminal during a call setup. In the example illustrated in FIG. 10, the presentation module of the callee's mobile phone displays the caller ID 1008 (i.e., caller Wei's phone number), the caller's nickname 1006 and an animation symbol 1004 associated with caller Wei. When callee Viprice receives a call from caller Wei, she has three choices to handle the call, answering the call 1010, answering the call in voice 1012 and declining the call 1014. For a video call, a callee has two choices regarding an incoming call: establishing a video communication with the caller for the video call (i.e., "answer the call" 1010) or establishing a voice communication with the caller for the video call (i.e., "answer the call in voice" 1012). Establishing a video communication with the caller generally requires more network bandwidth than a voice communication connection. Regardless the bandwidth requirement, a callee may choose to answer the call in voice because the callee does not want the caller to see him/her during the communication. Depending on the game performance of caller Wei, the ring tone (not shown in FIG. 10) of callee Viprice's mobile phone may be adjusted, such as playing back in a louder volume, a faster speed or shorter interval between consecutive rings compared with the corresponding original ring tone of Viprice's mobile phone.

FIG. 11 illustrates an exemplary presentation of call history on a callee's communication terminal illustrated in FIG. 10. In the example illustrated in FIG. 11, the call history between caller Wei and callee Viprice 1104 is presented in the display 1102 of callee Viprice's mobile phone. The call history shows two missed calls from caller Wei to callee Viprice: 1108 and 1112. For each missed call, there is a text message describing the caller's game play performance, 1110 and 114, respectively. During the first missed call 1108, caller Wei's bubble shooting performance is 25 bubbles while waiting for acceptance of the call from callee Viprice. During the second missed call 1112, caller Wei's bubble shooting performance is 30 bubbles while waiting for the acceptance of the call from the callee Viprice. The text message 1118 from callee Viprice 1116 is generated by the presentation module of callee Viprice's mobile phone upon callee Viprice's acknowledgement of missing the call 1112 from caller Wei. In one embodiment, callee Viprice acknowledges the missing of the call 1118 is by clicking a button (not shown in FIG. 11) on the display of callee Viprice's mobile phone. Callee Viprice can send text messages to caller Wei via an input box 1120.

Figure 4A:
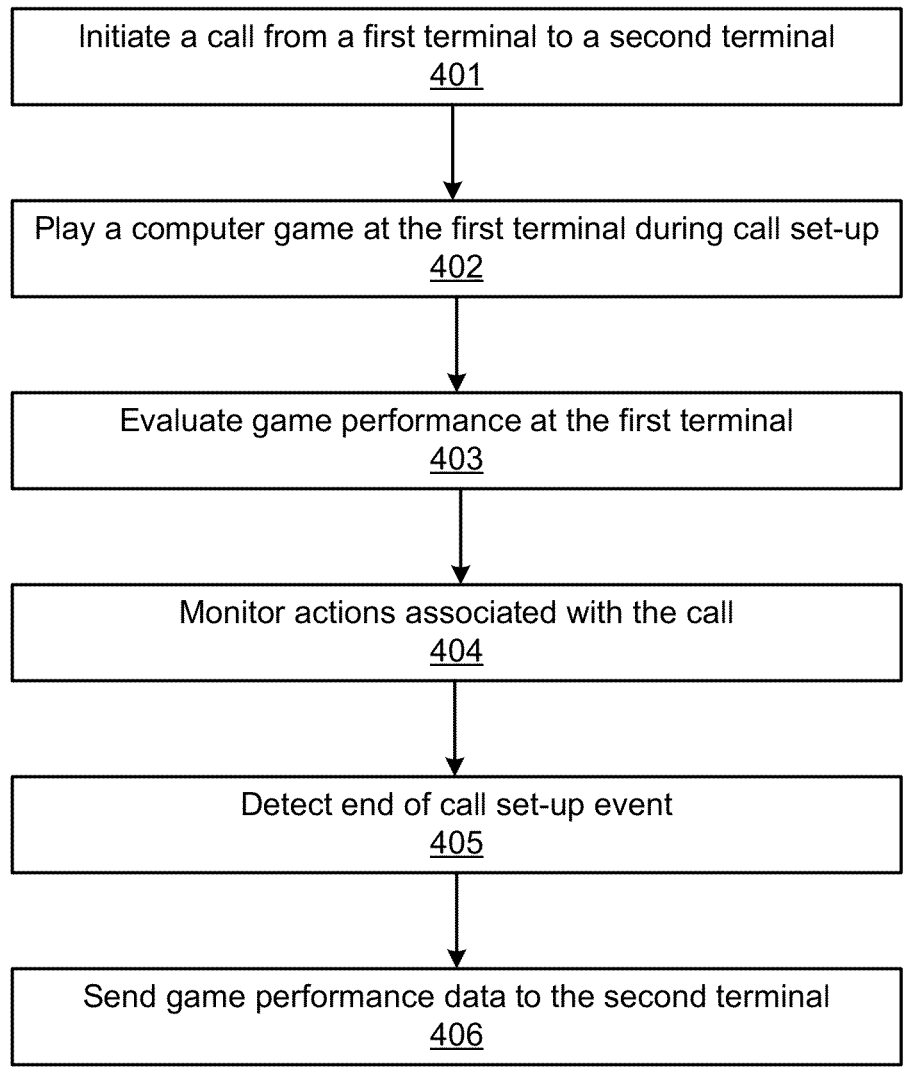
FIG. 4A is a flowchart illustrating a process of a call setup by a caller of the communication terminal illustrated in FIG. 3.

Referring back to FIG. 4A, FIG. 4A is a flowchart illustrating a process of a call setup by a caller of a communication terminal. Taking the computing environment illustrated in FIG. 1 as an example, initially, a user of the first terminal 110A, e.g., a mobile phone, initiates 401 a call to another party who uses the second terminal 110B to receive the call. The first terminal 110A sends a call request to the call sever 130, that registers the call request and connects the caller of the first terminal 110A with the callee of the second terminal 110B. While waiting for the call setup, the caller of the first terminal 110A plays 402 a computer game on the first terminal 110A. The evaluation module 340 of the first terminal 110A evaluates 403 the caller's game performance, such as counting how many bubbles shot by the caller during the call setup. The first terminal 110A monitors 404 actions associated with the call, such as a request to end the call by the caller or by the callee, or expiration of the time allocated to the call setup. Upon detecting 405 the end of the call setup, such as the caller hangs up the phone, the first terminal 110A sends the caller's overall game performance data to the second terminal 110B for display. The second terminal 110B displays the caller performance data on a display of the second terminal 110B, such as the display shown in FIG. 11.

Figure 4B:
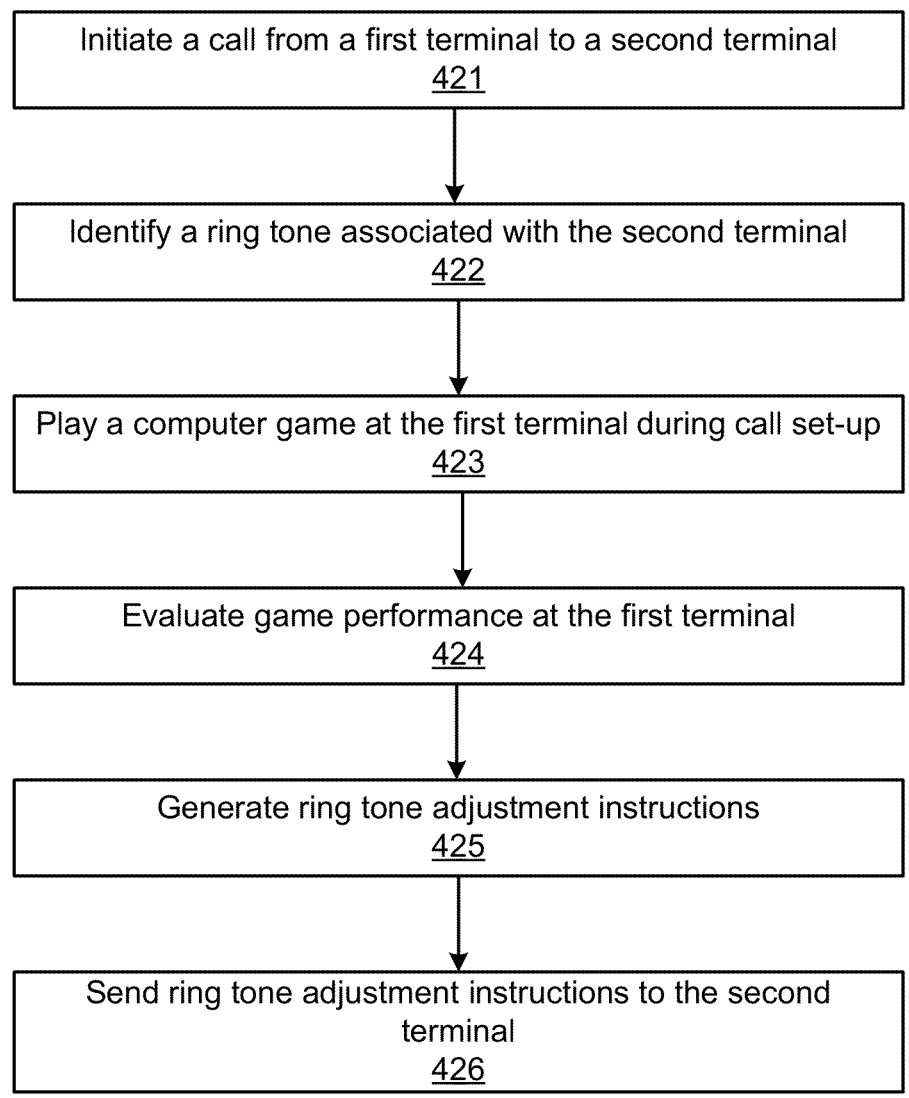
FIG. 4B is a flowchart illustrating a process of generating ring tone adjustment instructions for a callee's communication terminal according to one embodiment.

FIG. 4B is a flowchart illustrating a process of generating ring tone adjustment instructions for a callee's communication terminal according to one embodiment. Initially, a user of the first terminal 110A, e.g., a mobile phone, initiates 421 a call to another party who uses the second terminal 110B to receive the call. The first terminal 110A or the second terminal 110B identifies 422 a ring tone file to be played by the second terminal 110B, such as using the ring tone file stored on the first terminal 110A, the second terminal 110B or accessing the ring tone file stored in the ring tone sever 150. The caller of the first terminal 110A plays 423 a computer game on the first terminal 110A during the call setup. The first terminal 110A evaluates 424 the caller's game performance at the first terminal 110A and generates 425 ring tone adjustment instructions based on the caller's performance data, such as mapping the caller's game performance level to a ring tone control mode. The generated ring tone instruction instructs the second terminal 110B to generate an adjusted ring tone to be played by the second terminal 110B, such as shortening the interval between consecutive rings to indicate the urgency of the call from the caller to the callee. The first terminal 110A sends 426 the ring tone adjustment instructions to the second terminal 110B for execution, where the second terminal 110B generates an adjusted ring tone by executing the received ring tone adjustment instructions. Alternatively, the first terminal 110A stores the ring tone file of the ring tone to be played by the second terminal 110B, generates an adjusted ring tone according to the ring tone adjustment instructions and transmits the adjusted ring tone to the second terminal 110B for playback.

Figure 5A:
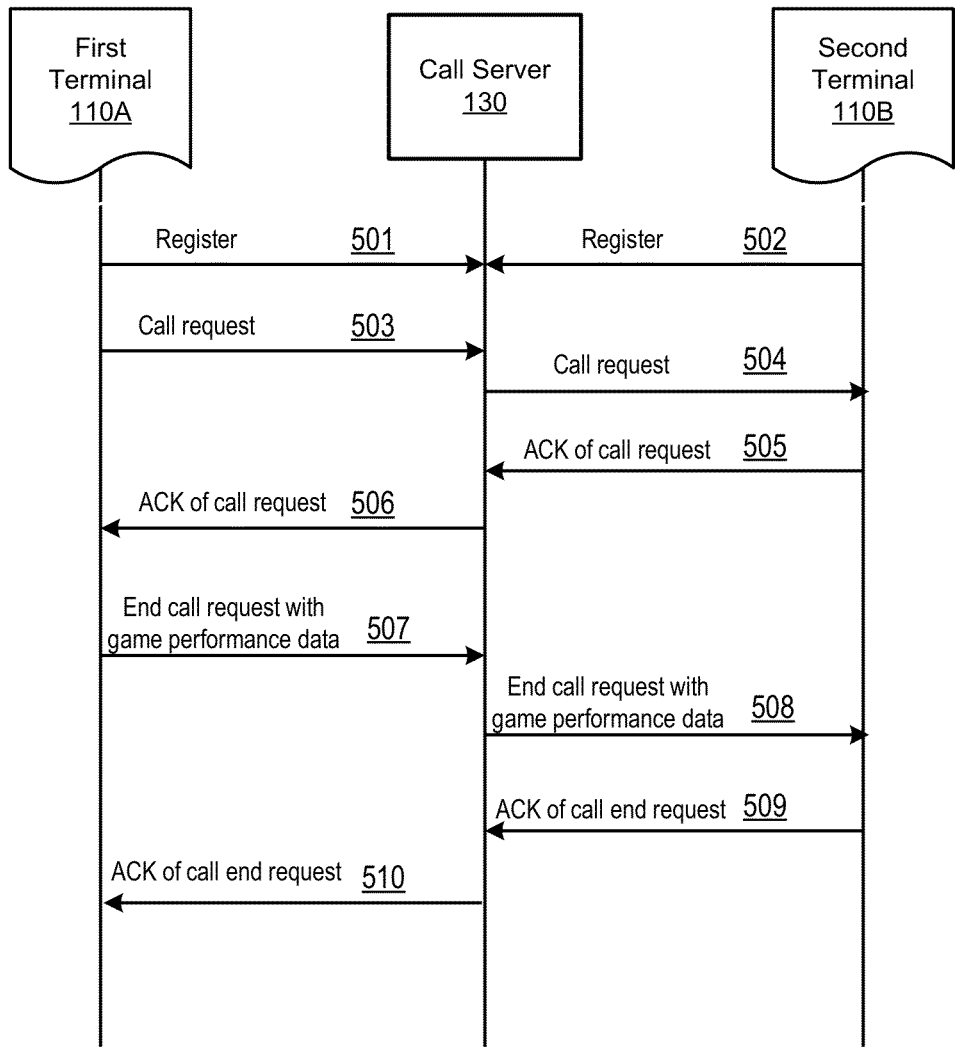
FIG. 5A illustrates interactions between two communication terminals to set up a video communication call and to end the video communication call setup according to one embodiment.

When a caller of a communication terminal calls a callee of another communication terminal, there are four situations that a call setup ends: the caller terminates the call; the callee terminates the call; the callee accepts the call; and upon expiration of the time allocated to the call setup, e.g., 15 seconds after the initiation of the call. FIG. 5A, FIG. B and FIG. 5C illustrate different situations where a call setup ends. FIG. 5A illustrates interactions between two communication terminals to set up a video call and to end the video call setup according to one embodiment. A caller uses the first terminal 110A, such as his/her mobile phone, to make a call to another party (i.e., the callee), who uses the second terminal 110B to receive the call. The first terminal 110A registers 501 with the call server 130 to place the call, and the second terminal 110B to register 502 with the call server 130 to receive the call. The first terminal 110A sends 503 a call request to the call server 130, which relays 504 the call request to the second terminal 110B. Upon receiving the call request at the second terminal 110B from the call server 130, the second terminal 110B sends 505 an acknowledgement of the call request to the call server 130, which relays 506 the acknowledgement to the first terminal 110A.

The caller of the first terminal 110A decides to end the call, such as pushing an end button on the first terminal 110A to signal the end. Upon the signal to end the call from the caller, the first terminal 110 ends 507 the call by sending an end call request to the call server 130. In one embodiment, the caller of the first terminal 110A plays a computer game on the first terminal 110A (not shown in FIG. 5A). The first terminal 110A obtains the caller's performance data and sends the caller's performance data simultaneously with the end call request to the call server 130, which relays 508 the end call request and the caller's game performance data to the second terminal 110B. Alternatively, the first terminal 110A may send the end call request and the caller's game performance data separately to the call server 130 for transmission to the second terminal 110B. The second terminal 110B acknowledges 509 the end call request with the call server 130, which relays 510 the acknowledgement to the first terminal 110A.

The second terminal 110B presents the caller's game performance data on the second terminal 110B.

Figure 5B:
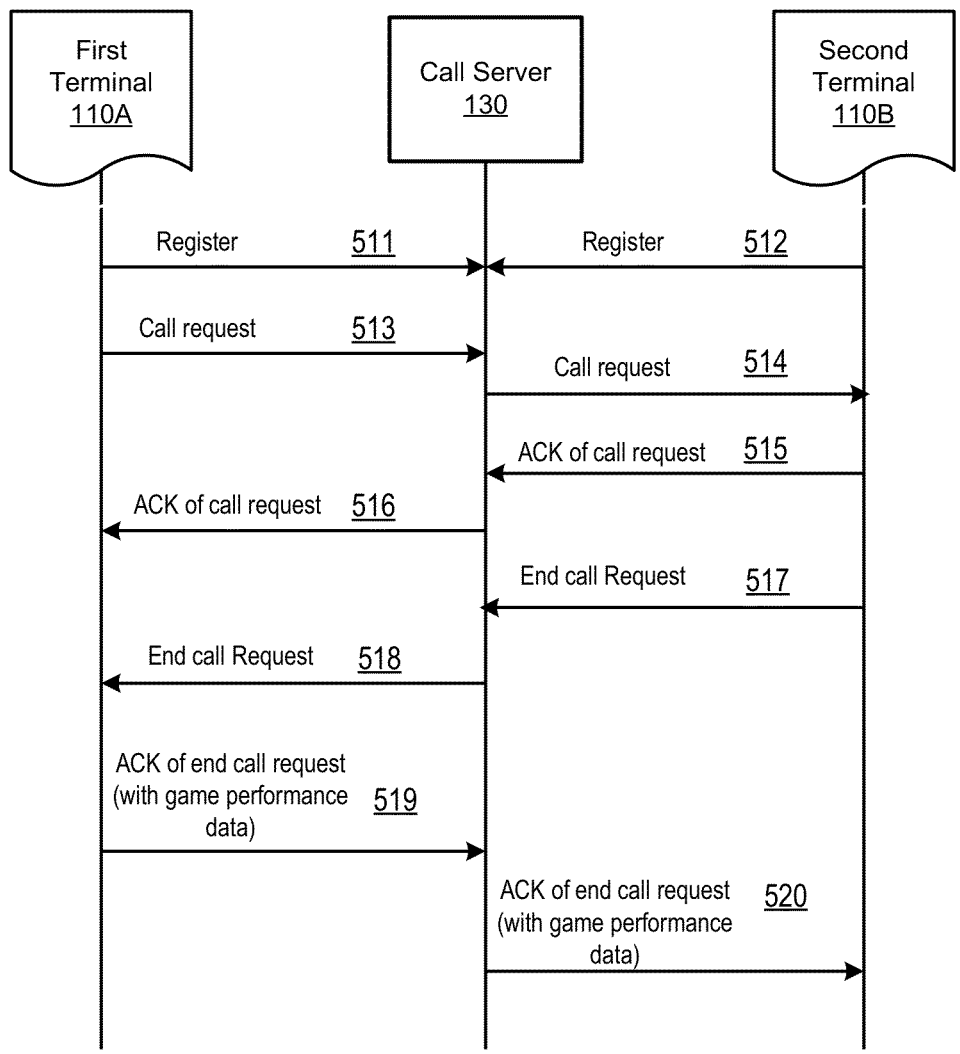
FIG. 5B illustrates interactions between two communication to set up a video communication call and to end the video communication call setup according to another embodiment.
Figure 5C:
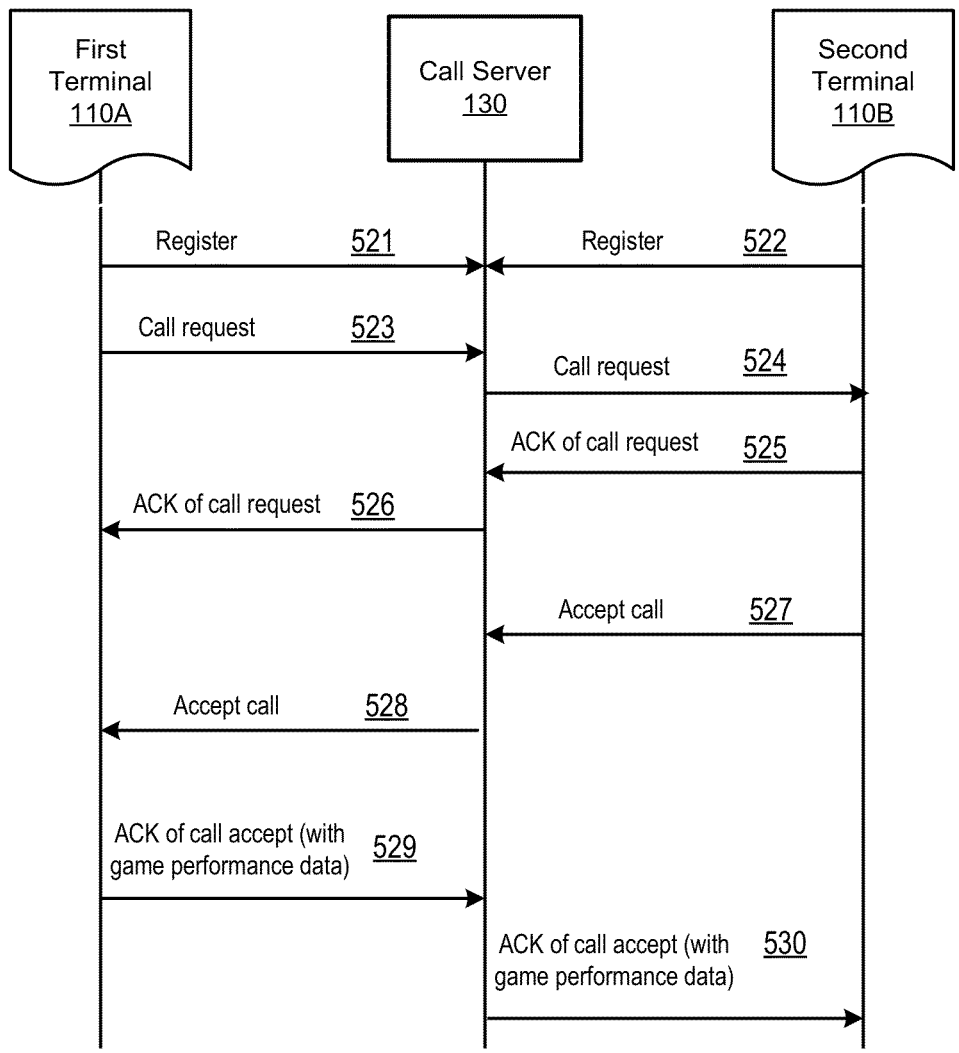
FIG. 5C illustrates interactions between two communication terminals to set up a video communication call and to end the video communication call setup according to a third embodiment.

FIG. 5B illustrates interactions between two communication terminals to set up a video call and to end the video call according to another embodiment. Compared with the situation illustrated in FIG. 5A, the caller of the first terminal 110A sets up a video call to the callee of the second terminal 110B similarly (steps 511 to step 516) as in FIG. 5A. Different from the situation illustrated in FIG. 5A, in the situation illustrated in FIG. 5B, the callee initiates the end call request by sending an end call request to the call server 130 at step 517. The call server 130 relays 518 the end call request to the first terminal 110A. Upon receiving the end call request, the first terminal 110A acknowledges 519 the request with the call server 130 and the caller's game performance data. The call server 130 sends the acknowledgement and the caller's game performance data simultaneously or separately to the second terminal 110B. The second terminal 110B presents the caller's game performance data on a display of the second terminal 110B.

FIG. 5C illustrates interactions between two communication terminals to set up a video call and to end the video call according to a third embodiment. Compared with the situation illustrated in FIG. 5A, where the caller ends the call, and the situation illustrated in FIG. 5B, where the callee ends the call, the situation illustrated in FIG. 5C shows a call setup ends when the callee accepts the call at the step 527, such as picking his/her mobile phone and starts talking with the caller. The signal of the callee accepting the call is sent to the call server 130, which relays the call acceptance signal to the first terminal 110A. Upon receiving the signal of call acceptance at the first terminal 110A, the caller of the first terminal stops playing the computer game on the first terminal 110A, and the first terminals 110A acknowledges 529 the end of the call setup with the call server 130. The first terminal 110A may send the caller's game performance data with the acknowledgement of the end of the call setup simultaneously or separately.

A fourth situation where a call setup ends (not shown) is the call setup lasts more than the time allocated to the call setup, such as 15 seconds. For the fourth situation, the first terminal 110A performs the actions similar to the ones described with respect to FIG. 5A. In other words, the first terminal 110A treats the fourth situation as if the caller of the first terminal 110A initiates the end of the call upon the detection of the expiration of the call setup.

Another aspect of the invention provides a solution to combine a caller's game performance data with the process of call setup, where the caller's game performance affects the way how the callee's communication terminal rings when receiving calls from the caller. The solution has multiple embodiments according, at least in part, to where the ring tone file associated with the ring tone of the callee's communication terminal locates and who, the caller or the callee, decides the ring tone file to be played on the callee's communication terminal.

Figure 6A:
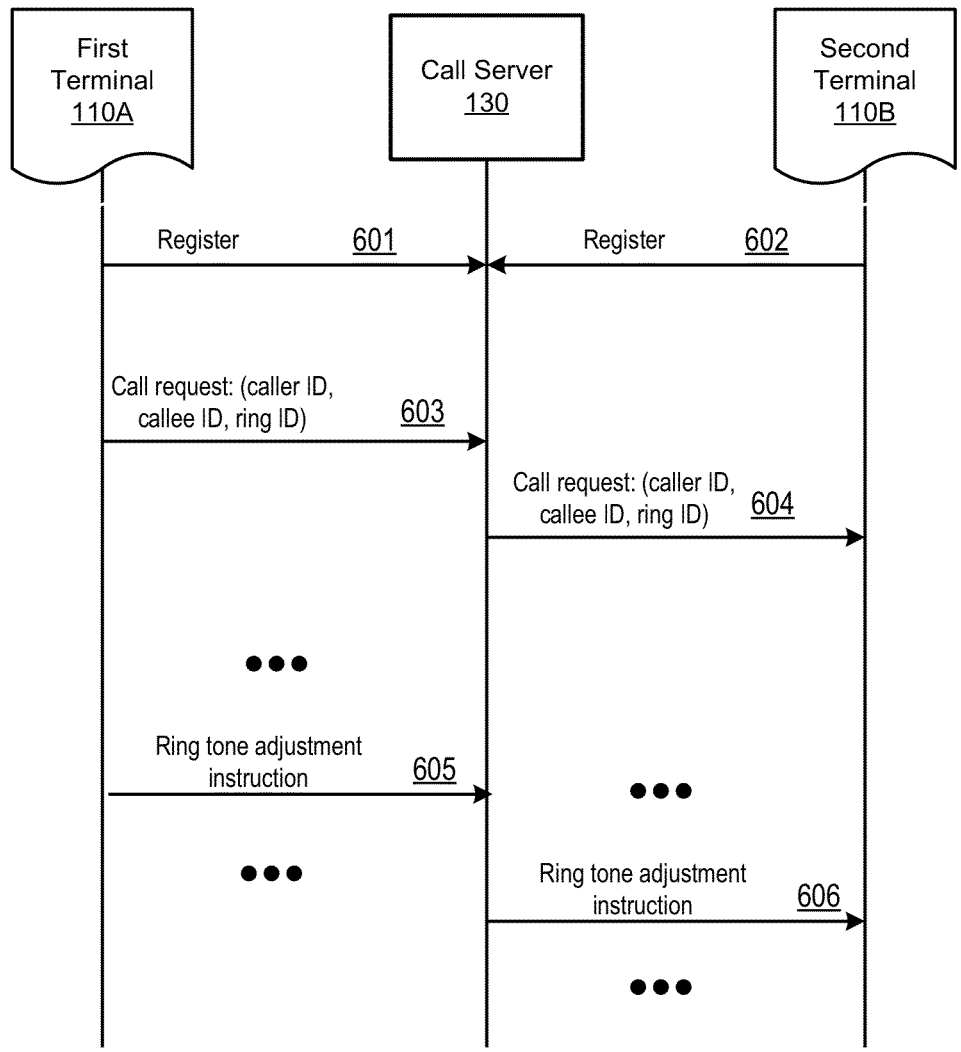
FIG. 6A illustrates interactions between two communication terminals to adjust the ring tone of a callee's communication terminal based on a set of ring tone files shared by the two communication terminals according to one embodiment.

FIG. 6A illustrates interactions between two communication terminals to adjust the ring tone of a callee's communication terminal based on a set of ring tone files shared by the two communication terminals according to one embodiment. In the configuration illustrated in FIG. 6A, the ring tone files to be played by the callee's communication terminal is located at the caller's communication terminal and the caller decides which ring tone file of the set of ring tone files to be played on the callee's communication terminal. Furthermore, the caller's communication terminal and the callee's communication terminal have been configured with the same set of ring tone files and the same ring tone identifiers identifying the same set of ring tone files. Sharing a same set of ring tone files allows the callee's communication terminal to identify the original ring tone and adjust the original ring tone based on the ring tone adjustment instructions from the first terminal 110A.

Initially, the first terminal 110A and the second terminal 110B register (step 601 and step 602, respectively) with the call server 130. At step 603, the caller of the first terminal 110A sends a call request to the call server 130, where the call request includes a caller ID, a callee ID and a ring ID. The ring ID identifies a ring tone file to be played by the second terminal 110B. Alternatively, the ring ID of the ring tone file played by the second terminal 110B can be sent to the call server 130 separately from a call request, which only includes the caller ID and the callee ID. The call server 130 relays 604 the call request to the second terminal 110B. The first terminal 110A and the second terminal 110B continues the process of call setup, such as acknowledge the call request, while the caller of the first terminal 110A plays a computer game on the first terminal 110A during the call setup.

Upon receiving the call request at the second terminal 110B, a ring tone playback module of the second terminal 110B, such as the processing module 330 illustrated in FIG. 3, executes a ring tone file identified by the ring ID to generate a ring tone with a default playback volume, speed and style. During the call setup, the first terminal 110A periodically generates a ring adjustment instruction based on the caller's game performance, where the ring tone adjustment instruction indicates how to adjust the default ring tone by the second terminal 110B, such as adjusting the volume, speed and style associated with the default ring tone. The first terminal 110A sends the ring tone adjustment instruction to the call server 130, which relays the instruction to the second terminal 110B. The second terminal 110B adjusts the playback of the default ring tone according to the received ring tone adjustment instruction and plays back the adjusted ring tone. The adjusted ring tone may have a different volume, speed or style from the corresponding original ring tone depending on the adjustment made to the corresponding original ring tone. If the callee's communication terminal does not receive ring tone adjustment instructions, the callee's communication terminal continues playing the original ring tone as a default ring tone for incoming calls.

Figure 6B:
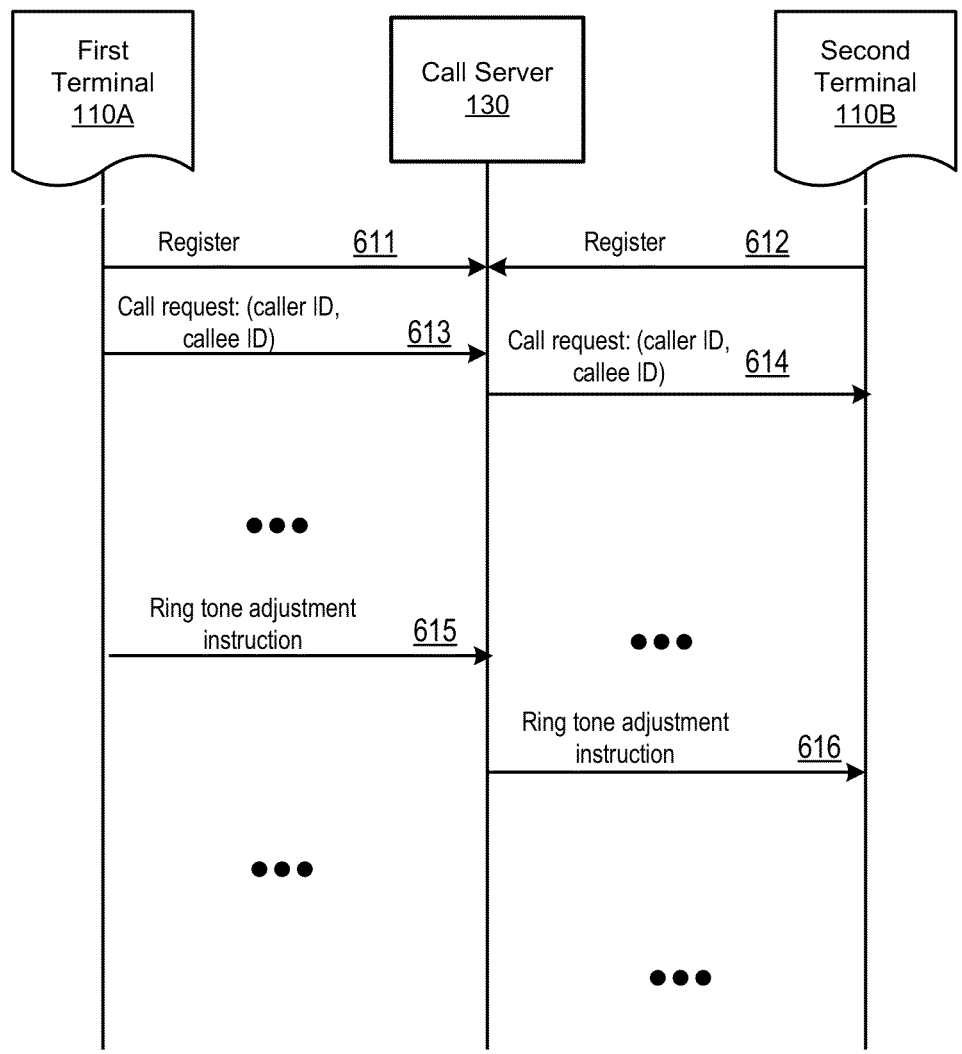
FIG. 6B illustrates interactions between two communication terminals to adjust the ring tone of a callee's communication terminal based on a set of ring tone files shared by the two communication terminals according to another embodiment.

FIG. 6B illustrates interactions between two communication terminals to adjust ring tone of a callee's communication terminal based on a set of ring tone files shared by the two communication terminals according to another embodiment. Compared with the scenario illustrated in FIG. 6B, in the scenario illustrated in FIG. 6B, it is the callee who decides the ring tone file to be played by the second terminal 110B; in other words, the call request (i.e., step 613) from the first terminal 110A does not include a ring ID to identify a ring tone file to be played by the second terminal 110B. In this scenario, the second terminal 110B can have different ring tone files for different caller IDs. For example, for a close friend, the second terminal 110B selects a light-hearted song as its ring tone; for a co-worker, the second terminal 110B may select a ring tone that sounds more serious.

During the call setup, the first terminal 110A generates ring adjustment instruction based on the caller's game performance, where the ring tone adjustment instruction indicates how to adjust a default ring tone by the second terminal 110B. The second terminal 110B receives the ring tone adjustment instruction relayed by the call server 130, adjusts the playback of the default ring tone according to the received ring tone adjustment instruction, and plays back the adjusted ring tone.

Figure 7A:
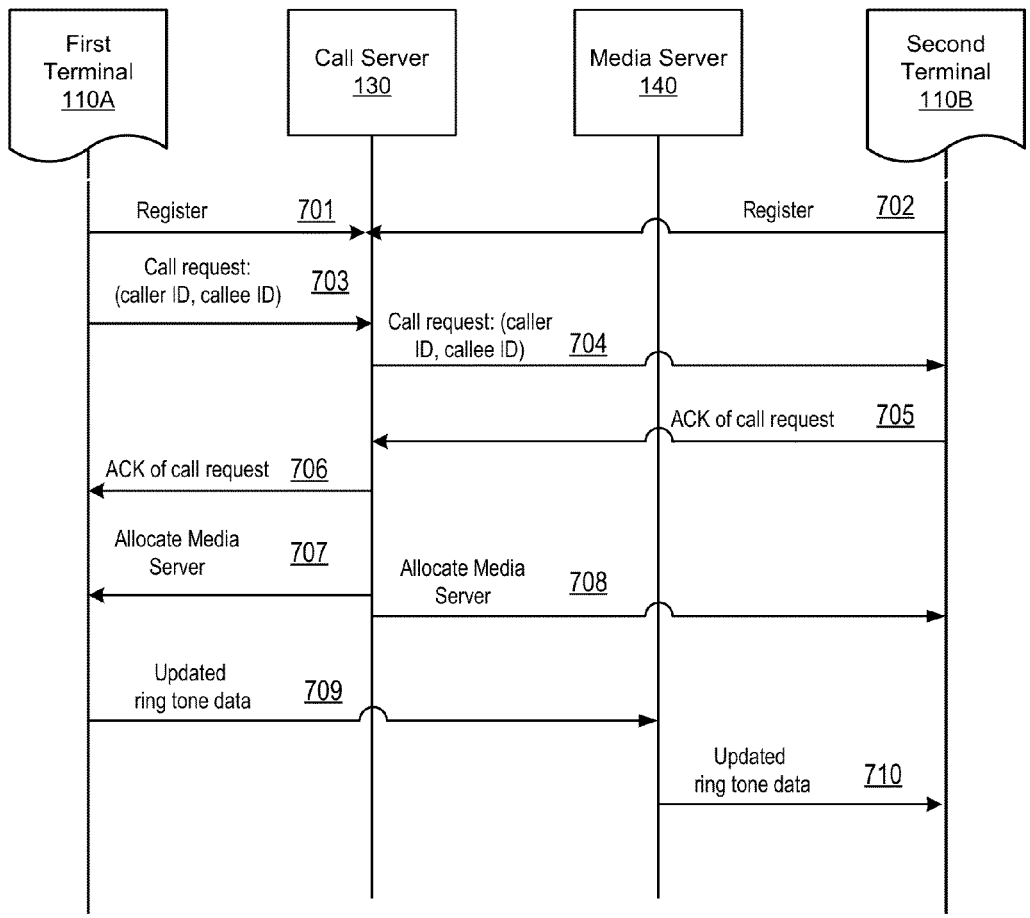
FIG. 7A illustrates interactions between two communication terminals to adjust the ring tone of a callee's communication terminal without using a set of ring tones files by the two communication terminals according to one embodiment.

FIG. 7A illustrates interactions between two communication terminals to adjust ring tone of a callee's communication terminal without using the same set of ring tones files by the two communication terminals according to one embodiment. In the configuration illustrated in FIG. 7A, the ring tone file associated with a ring tone to be played by the callee's communication terminal is located at the caller's communication terminal and the caller decides the ring tone file to be played by the callee's communication terminal. Furthermore, the caller's communication terminal and the callee's communication terminal do not have the same set of ring tone files. The first terminal 110A of the caller adjusts the ring tone to be played by the second terminal 110B of the callee according to the caller's game performance data.

Initially, the first terminal 110A and the second terminal 110B register with the call server 130 (i.e., steps 701 and 702). The first terminal 110A sends 703 a call request to the call server 130. The call request includes a caller ID and a callee ID. The call server 130 relays 704 the call request to the second terminal 110B, which acknowledges 705 the call request with the call server 130. The call server 130 relays 706 the call request acknowledgement to the first terminal 110A and allocates a media server (e.g. the media sever 140) to the first terminal 110A and the second terminal 110B. In one embodiment, the call server 130 notifies (e.g., steps 707 and 708) the both terminals 110A and 110B the web address of the media server 140, such as the universal resource location (URL) of the media server 140. The first terminal 110A generates an adjusted ring tone to be played by the second terminal 110B based on the performance data of the caller of the first terminal 110A and sends 709 the adjusted ring tone to the media server 140, which relays the adjusted ring tone to the second terminal 110B for playback.

Figure 7B:
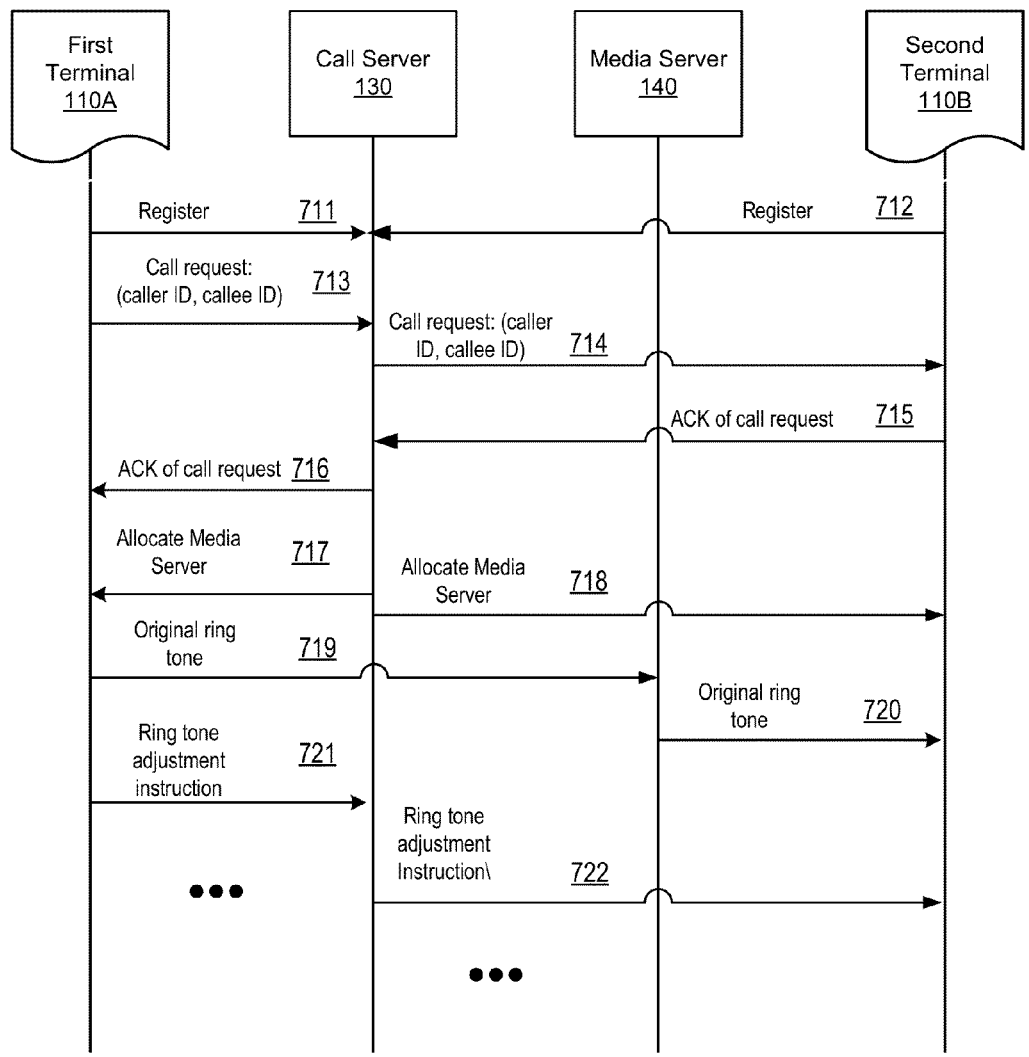
FIG. 7B illustrates interactions between two communication terminals to adjust the ring tone of a callee's communication terminal without using a set of ring tones files by the two communication terminals according to another embodiment.

FIG. 7B illustrates interactions between two communication terminals to adjust ring tone of a callee's communication terminal without using the same set of ring tones files by the two communication terminals according to another embodiment. The scenario illustrated in FIG. 7B is different from the scenario illustrated in FIG. 7A in that the first terminal 110A transmits 719 the original ring tone data associated with the second terminal 110B through the media server 240, such as uploading the original ring tone data to the media server 140, from which the second terminal 110B can download the original ring tone data for playback on the second terminal 110B. During the call setup, the first terminal 110A periodically generates the ring tone adjustment instruction based the caller's game performance and transmits 721 to the second terminal 110B through the call server 130. The second terminal 110B adjusts the original ring tone by modifying the original ring tone data based on the received ring tone adjustment instruction, such as increasing the volume of the original ring tone when playing back.

In addition to store the ring tone files associated with the second terminal 110B at the first terminal 110A or at both terminals, the ring tone files associated with the second terminal 110B can be stored at a dedicated ring tone server, such as the ring tone sever 150 illustrated in FIG. 1. Storing the ring tone files at a dedicated ring tone server enables easy access to the ring tone files by the second terminal 110B and help balance network load of the system illustrated in FIG. 1.

Figure 8A:
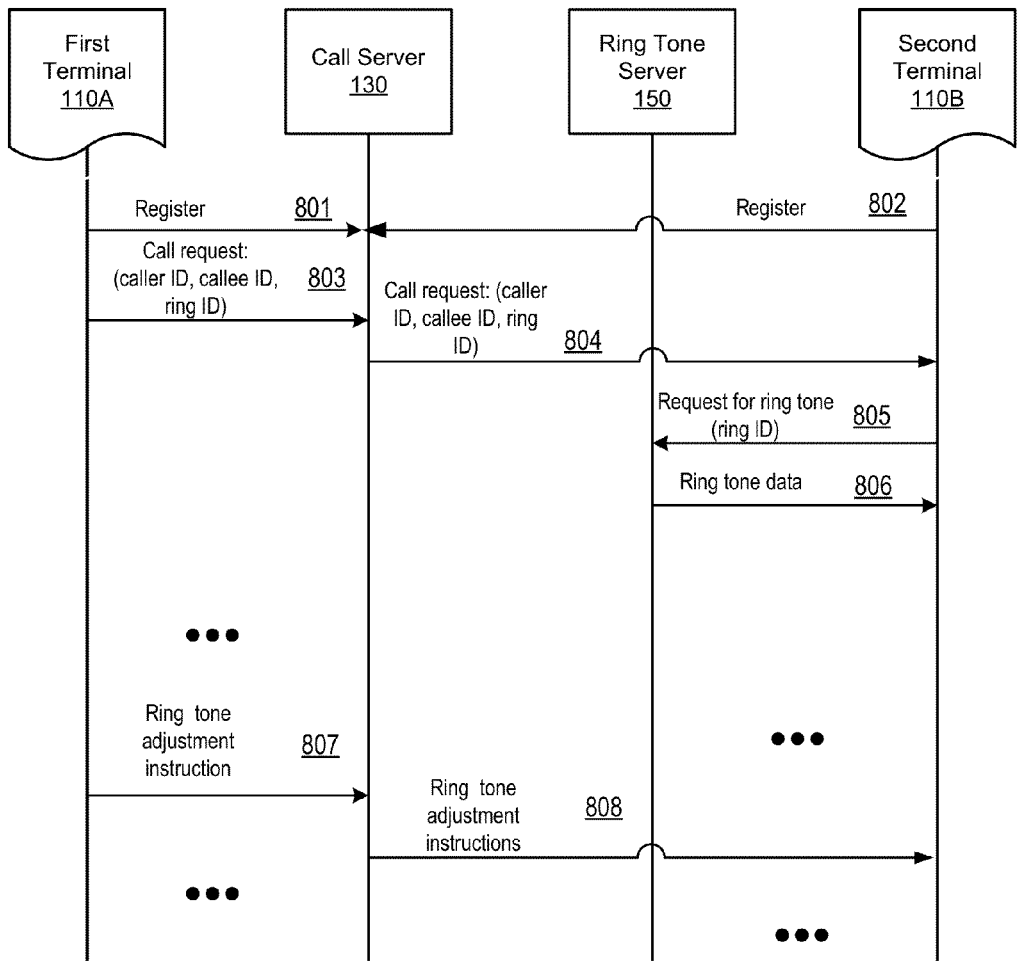
FIG. 8A illustrates interactions between two communication terminals to adjust the ring tone of a callee's communication terminal based on ring tone files stored in a computer server according to one embodiment.

FIG. 8A illustrates interactions between two communication terminals to adjust ring tone of a callee's communication terminal based on the ring tone files stored in a ring stone server according to one embodiment. In the configuration illustrated in FIG. 8A, the caller of the first terminal 110A decides the ring tone file to be played by the second terminal 110B. Initially, the first terminal 110A and the second terminal 110B register with the call sever 130 (at steps 801 and 802). The first terminal 110A sends 803 a call request including a caller ID, a callee ID and a ring ID to the call server 130. The ring ID identifies a ring tone file to be played by the second terminal 110B. Upon receiving the call request and the ring ID from the call server 130, the second terminal 110B accesses the ring tone server 150 to get the original ring tone data (e.g., an executable audio file when executed making a ring on the second terminal 110B) using the ring ID. During the call setup, the first terminal 110A periodically generates a ring tone adjustment instruction based the caller's game performance and transmits 807 the instruction to the second terminal 110B through the call server 130. The second terminal 110B adjusts the original ring tone by modifying the original ring tone data based on the received ring tone adjustment instruction, such as increasing the volume of the original ring tone when playing back.

Figure 8B:
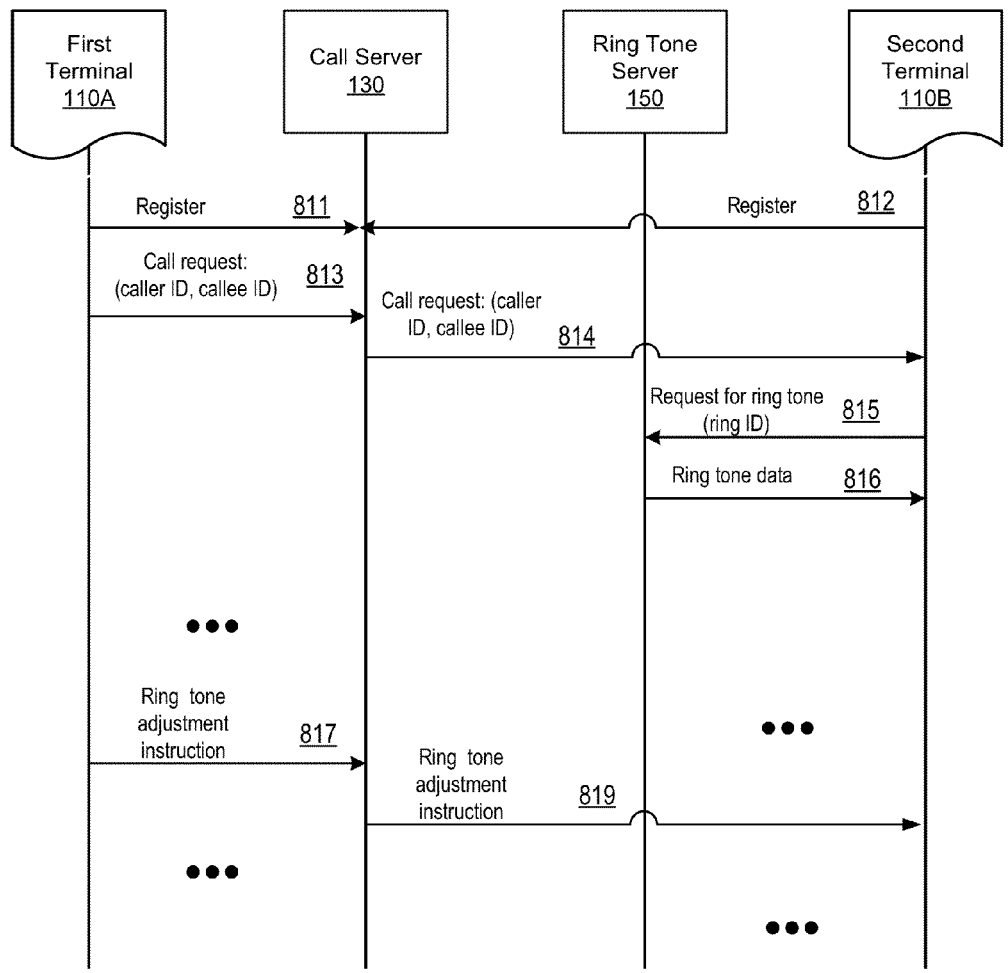
FIG. 8B illustrates interactions between two communication terminals to adjust the ring tone of a callee's communication terminal based on ring tone files stored in a computer server according to another embodiment.

FIG. 8B illustrates interactions between two communication terminals to adjust the ring tone of a callee's communication terminal based on the ring tone files stored in a ring tone server according to another embodiment. Comparing with the configuration illustrated in FIG. 8A, the callee of the second terminal 110B decides the ring tone file to be played by the second terminal 110B. In one embodiment, the second terminal 110B selects a ring tone file to be played based on the caller ID. For example, if the caller is a close friend, the second terminal 110B selects a light-hearted song as its default ring tone for receiving calls from the close friend. During the call setup, the first terminal 110A periodically generates a ring tone adjustment instruction based the caller's game performance and transmits 817 the instruction to the second terminal 110B through the call server 130. The second terminal 110B adjusts the default ring tone by modifying the original ring tone data based on the received ring tone adjustment instruction, such as increasing the volume of the original ring tone when playing back.

A solution to enhanced user experience in digital media content sharing and consumption is to inactively combine call setup for a video communication session with a caller's game performance data. Integrating a caller's game performance data with a video communication setup makes the video communication setup more joyful for the parties and conveys valuable psychotherapeutic value in the video communication between the parties.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for interactively combining call setup and game data, the method comprising:
    initiating, by a first communication terminal, a video call between the first communication terminal and a second communication terminal;
    identifying a ring tone file to be played by the second communication terminal for receiving calls at the second communication terminal;
    evaluating game performance of a user of the first communication terminal for a computer game played by the user on the first communication terminal during call setup;
    generating a ring tone adjustment instruction based on the game performance of the user of the first communication terminal during the call setup, the ring tone adjustment instruction indicating at least one modification to a ring tone associated with the identified ring tone file to be played by the second communication terminal; and
    transmitting overall game performance data of the user of the first communication terminal to the second communication terminal for display.

2. The method of claim 1, wherein initiating the video call between the first communication terminal and the second communication terminal comprises:
    sending a call request to a computer server, the call request identifying a caller using the first communication terminal to initiate the video call and a callee using the second communication terminal to receive the video call.

3. The method of claim 1, wherein identifying a ring tone file to be played by the second communication terminal comprises:
    sending a call request to a computer server, the call request including a ring identification identifying a ring tone file to be played by the second communication terminal.

4. The method of claim 1, wherein identifying a ring tone file to be played by the second communication terminal further comprises:
    determining which one of the first communication terminal and the second communication terminal decides the ring tone file to be played by the second communication terminal; and
    determination where the ring tone file to be played by the second communication terminal is stored.

5. The method of claim 1, wherein a ring tone file to be played by the second communication terminal, when executed, generates an audio sound representing a ring tone to indicate an incoming video call to the second communication terminal, and wherein a ring tone having a plurality of characteristics described by a plurality metadata associated with the ring tone.

6. The method of claim 5, wherein the plurality of metadata associated with the ring tone comprises at least one of the following:
    volume of the ring tone;
    speed of the ring tone;
    style of the ring tone;
    length of internal between two consecutive rings; and
    source of the ring tone.

7. The method of claim 1, wherein evaluating game performance of a user of the first communication terminal for a computer game played by the user on the first communication terminal during call setup comprises:
    classifying the game performance of the user into a plurality of performance classes, each of the performance classes representing a measurement of the game performance; and
    assigning a threshold value to each of the plurality of performance classes.

8. The method of claim 1, wherein generating a ring tone adjustment instruction based on the game performance of the user of the first communication terminal comprises:
    mapping the game performance to one of a plurality of ring tone control modes associated with the ring tone, each of the ring tone control modes representing an adjustment to at least one of a plurality of metadata associated with the ring tone.

9. The method of claim 1, wherein generating a ring tone adjustment instruction based on the game performance of the user of the first communication terminal comprises further comprises:
    transmitting the ring tone adjustment instruction to the second communication terminal, wherein the second communication terminal is adapted to generate an adjusted ring tone based on the ring tone adjustment instruction.

10. The method of claim 1, wherein generating a ring tone adjustment instruction based on the game performance of the user of the first communication terminal further comprises:
    generating an adjusted ring tone by the first communication terminal based on the ring tone adjustment instruction; and
    transmitting the adjusted ring tone to the second communication terminal, wherein the second communication terminal is adapted to play back the adjusted ring tone.

11. The method of claim 1, further comprising:
    transmitting the game performance data to the second communication terminal, wherein the second communication terminal is adapted to display the game performance data on a display of the second communication terminal.

12. The method of claim 1, further comprising detecting end of the call setup, wherein the end of the call setup is detected responsive to at least one of the following events:
    the first communication terminal initiating the end of the call setup;

the second communication terminal initiating the end of the call setup;

the second communication terminal accepting the call from the first communication terminal; and the call setup lasting more than a time limit allocated to the call setup.

13. A device for interactively combining call setup and game data, comprising:

a computer processor for executing computer program modules; and a non-transitory computer readable storage device storing computer program modules executable to perform steps comprising:

initiating, by a first communication terminal, a video call between the first communication terminal and a second communication terminal;

identifying a ring tone file to be played by the second communication terminal for receiving calls at the second communication terminal;

evaluating game performance of a user of the first communication terminal for a computer game played by the user on the first communication terminal during call setup;

generating a ring tone adjustment instruction based on the game performance of the user of the first communication terminal during the call setup, the ring tone adjustment instruction indicating at least one modification to a ring tone associated with the identified ring tone file to be played by the second communication terminal; and transmitting overall game performance data of the user of the first communication terminal to the second communication terminal for display.

14. The device of claim 13, wherein initiating the video call between the first communication terminal and the second communication terminal comprises:

sending a call request to a computer server, the call request identifying a caller using the first communication terminal to initiate the video call and a callee using the second communication terminal to receive the video call.

15. The device of claim 13, wherein identifying a ring tone file to be played by the second communication terminal comprises:

sending a call request to a computer server, the call request including a ring identification identifying a ring tone file to be played by the second communication terminal.

16. The device of claim 13, wherein identifying a ring tone file to be played by the second communication terminal further comprises:

determining which one of the first communication terminal and the second communication terminal decides the ring tone file to be played by the second communication terminal; and determination where a ring tone file to be played by the second communication terminal is stored.

17. The device of claim 13, wherein a ring tone file to be played by the second communication terminal, when executed, generates an audio sound representing a ring tone to indicate an incoming video call to the second communication terminal, and wherein a ring tone having a plurality of characteristics described by a plurality metadata associated with the ring tone.

18. The device of claim 17, wherein the plurality of metadata associated with the ring tone comprises at least one of the following:

volume of the ring tone;
speed of the ring tone;
style of the ring tone;
length of internal between two consecutive rings; and
source of the ring tone.

19. The device of claim 13, wherein evaluating game performance of a user of the first communication terminal for a computer game played by the user on the first communication terminal during call setup comprises:

classifying the game performance of the user into a plurality of performance classes, each of the performance classes representing a measurement of the game performance; and assigning a threshold value to each of the plurality of performance classes.

20. The device of claim 13, wherein generating a ring tone adjustment instruction based on the game performance of the user of the first communication terminal comprises:

mapping the game performance to one of a plurality of ring tone control modes associated with the ring tone, each of the ring tone control modes representing an adjustment to at least one of a plurality of metadata associated with the ring tone.

21. The device of claim 13, wherein generating a ring tone adjustment instruction based on the game performance of the user of the first communication terminal comprises further comprises:

transmitting the ring tone adjustment instruction to the second communication terminal, wherein the second communication terminal is adapted to generate an adjusted ring tone based on the ring tone adjustment instruction.

22. The device of claim 13, wherein generating a ring tone adjustment instruction based on the game performance of the user of the first communication terminal further comprises:

generating an adjusted ring tone by the first communication terminal based on the ring tone adjustment instruction; and transmitting the adjusted ring tone to the second communication terminal, wherein the second communication terminal is adapted to play back the adjusted ring tone.

23. The device of claim 13, further comprising:

transmitting the game performance data to the second communication terminal, wherein the second communication terminal is adapted to display the game performance data on a display of the second communication terminal.

24. The device of claim 13, further comprising detecting end of the call setup, wherein the end of the call setup is detected responsive to at least one of the following events:

the first communication terminal initiating the end of the call setup;

the second communication terminal initiating the end of the call setup;

the second communication terminal accepting the call from the first communication terminal; and the call setup lasting more than a time limit allocated to the call setup.

25. A non-transitory computer readable medium storing executable computer program instructions for interactively combining call setup and game data, the computer program instructions comprising instructions for:

initiating, by a first communication terminal, a video call between the first communication terminal and a second communication terminal;

identifying a ring tone file to be played by the second communication terminal for receiving calls at the second communication terminal;

evaluating game performance of a user of the first communication terminal for a computer game played by the user on the first communication terminal during call setup;

generating a ring tone adjustment instruction based on the game performance of the user of the first communication terminal during the call setup, the ring tone adjustment instruction indicating at least one modification to a ring tone associated with the identified ring tone file to be played by the second communication terminal; and transmitting overall game performance data of the user of the first communication terminal to the second communication terminal for display.

26. The computer readable medium of claim 25, wherein initiating the video call between the first communication terminal and the second communication terminal comprises:

sending a call request to a computer server, the call request identifying a caller using the first communication terminal to initiate the video call and a callee using the second communication terminal to receive the video call.

27. The computer readable medium of claim 25, wherein identifying a ring tone file to be played by the second communication terminal comprises:

sending a call request to a computer server, the call request including a ring identification identifying a ring tone file to be played by the second communication terminal.

28. The computer readable medium of claim 25, wherein identifying a ring tone file to be played by the second communication terminal further comprises:

determining which one of the first communication terminal and the second communication terminal decides the ring tone file to be played by the second communication terminal; and determination where the ring tone file to be played by the second communication terminal is stored.

29. The computer readable medium of claim 25, wherein a ring tone to be played by the second communication terminal, when executed, generates an audio sound representing a ring tone to indicate an incoming video call to the second communication terminal, and wherein a ring tone having a plurality of characteristics described by a plurality metadata associated with the ring tone.

30. The computer readable medium of claim 29, wherein the plurality of metadata associated with the ring tone comprises at least one of the following:

volume of the ring tone;
speed of the ring tone;
style of the ring tone;
length of internal between two consecutive rings; and
source of the ring tone.

31. The computer readable medium of claim 25, wherein evaluating game performance of a user of the first communication terminal for a computer game played by the user on the first communication terminal during call setup comprises:

classifying the game performance of the user into a plurality of performance classes, each of the performance classes representing a measurement of the game performance; and assigning a threshold value to each of the plurality of performance classes.

32. The computer readable medium of claim 25, wherein generating a ring tone adjustment instruction based on the game performance of the user of the first communication terminal comprises:

mapping the game performance to one of a plurality of ring tone control modes associated with the ring tone, each of the ring tone control modes representing an adjustment to at least one of a plurality of metadata associated with the ring tone.

33. The computer readable medium of claim 25, wherein generating a ring tone adjustment instruction based on the game performance of the user of the first communication terminal comprises further comprises:

transmitting the ring tone adjustment instruction to the second communication terminal, wherein the second communication terminal is adapted to generate an adjusted ring tone based on the ring tone adjustment instruction.

34. The computer readable medium of claim 25, wherein generating a ring tone adjustment instruction based on the game performance of the user of the first communication terminal further comprises:

generating an adjusted ring tone by the first communication terminal based on the ring tone adjustment instruction; and transmitting the adjusted ring tone to the second communication terminal, wherein the second communication terminal is adapted to play back the adjusted ring tone.

35. The computer readable medium of claim 25, further comprising:

transmitting the game performance data to the second communication terminal, wherein the second communication terminal is adapted to display the game performance data on a display of the second communication terminal.

36. The computer readable medium of claim 25, further comprising detecting end of the call setup, wherein the end of the call setup is detected responsive to at least one of the following events:

the first communication terminal initiating the end of the call setup;

the second communication terminal initiating the end of the call setup;

the second communication terminal accepting the call from the first communication terminal; and the call setup lasting more than a time limit allocated to the call setup.

* * * * *